United States Patent
Marupaduga et al.

(10) Patent No.: US 10,056,992 B1
(45) Date of Patent: Aug. 21, 2018

(54) DYNAMICALLY ADJUSTING A CALIBRATION RATE

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/659,140

(22) Filed: Jul. 25, 2017

(51) Int. Cl.
  *H04B 17/00* (2015.01)
  *H04B 17/21* (2015.01)
  *H04B 1/18* (2006.01)

(52) U.S. Cl.
  CPC ............. *H04B 17/21* (2015.01); *H04B 1/18* (2013.01)

(58) Field of Classification Search
  CPC .......... H04B 17/21; H04B 1/18; H04W 24/00
  USPC ............................................ 455/67.11, 67.16
  See application file for complete search history.

(56) References Cited

U.S. PATENT DOCUMENTS

| | | | | |
|---|---|---|---|---|
| 8,049,662 | B2* | 11/2011 | Stayton | G01S 7/4026 342/165 |
| 9,439,092 | B1* | 9/2016 | Chukka | H04W 24/04 |
| 9,490,534 | B1* | 11/2016 | Marupaduga | H04B 17/12 |
| 2016/0239459 | A1* | 8/2016 | Dickson | G06F 13/00 |

* cited by examiner

*Primary Examiner* — Sonny Trinh (57) ABSTRACT

Methods and systems are provided for dynamical calibration of phase signals and/or amplitudes in a telecommunication system. Calibration of phases is a necessary measure to ensure proper phasing and, as a result, emission of correct beamforming patterns. Without correct phasing (and emission of correct beamforming patterns), performance of a telecommunication network may suffer and user satisfaction may decrease. However, calibration provides a period of time where service is not provided and should not be done too often as it will decrease service provided and, likely, satisfaction of service received if there are frequent periods of outages. By utilizing specific telecommunication metrics, such as temperature, performance, or error vector magnitude, necessary calibrations may be identified and evaluated such that a determination regarding an optimal calibration time is made to balance providing service and a period of service outage.

18 Claims, 7 Drawing Sheets

DYNAMICALLY ADJUSTING A CALIBRATION RATE

SUMMARY

The present disclosure is directed, in part, to dynamically adjusting a calibration rate for a telecommunication system, substantially as shown in and/or described in connection with at least one of the figures, and as set forth more completely in the claims.

In aspects set forth herein, certain telecommunication metrics may be monitored, evaluated, received, retrieved, etc. to identify potential calibrations that may be needed. Calibrations, as used herein, generally refer to adjustments to a phase signal or amplitude. In specific embodiments, a calibration is an adjustment to phase signals arriving at an antenna (from, e.g., a radio). If the phase signals are not calibrated correctly, there are various negative effects on the telecommunication system, either directly or indirectly. For instance, the beamforming pattern may be distorted due to phase signals received at the antenna being off or not calibrated correctly. A distorted beamforming pattern may cause a decrease in a number of users served, a decrease in a quality of service to those that are served, and the like.

Alternatively, calibrations cannot be performed all the time or too frequently as calibrations create a period of time where no one is being served. In other words, there is a service outage during calibrations. If this is done too frequently, users would likely become frustrated as service would not be provided as frequently as they would like. Thus, calibrations must be balanced with a need to provide service for a maximum period of time.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In certain aspects, methods are provided for dynamically adjusting a calibration rate. For instance, if certain telecommunication metrics are above or below a predetermined threshold for a specific metric, calibration may be warranted but, due to the static nature of calibration rates, may not be scheduled to occur for some period of time. Without appropriate calibration at the appropriate times, services provided may be impacted, a number of total users served may be reduced, user satisfaction may decrease, as well as other negative consequences.

Providing methods and systems for dynamically adjusting a calibration rate has a wide array of technical benefits. For example, an end user using a user device may be provided clear technical benefits such as better signal strength relating to overall better performance of their device. The service provider may also be the recipient of clear technical benefits including providing a higher quality service to the end user and being able to identify optimal times to calibrate phase signals using specific telecommunication metrics. Additionally, resources are conserved by eliminating unnecessary calibrations.

In a first aspect, a method for dynamically adjusting a calibration rate is provided. The method comprises receiving a first set of telecommunication metrics; analyzing the first set of telecommunication metrics based on a relationship of the telecommunication metrics with a predetermined threshold; determining calibrations for one or more phase signals to alter the telecommunication metrics; and dynamically applying the calibrations to the one or more phase signals.

In another aspect, a method is provided for dynamically adjusting a calibration rate. The method comprises receiving a first set of temperature measurements of a plurality of cables between a radio and an antenna; analyzing the first set of temperature measurements to detect a temperature difference between at least two of the plurality of cables; determining that calibration is needed utilizing the temperature difference and temperature logic; and dynamically applying the calibration to a phase signal communicated from a radio to an antenna.

In yet another aspect, a dynamic calibration system for dynamically adjusting a calibration rate is provided. The dynamic calibration system comprises a processor; and one or more computer storage hardware devices storing computer-usable instructions that, when used by the processor, cause the processor to receive a first set of temperature measurements from one or more temperature sensors of a plurality of cables between a radio and an antenna; analyze the first set of temperature measurements to detect a temperature difference between at least two of the plurality of cables; determine that calibration is needed utilizing the temperature difference and temperature logic; and dynamically apply the calibration to a phase signal.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 25th Edition (2009).

Figure 1:
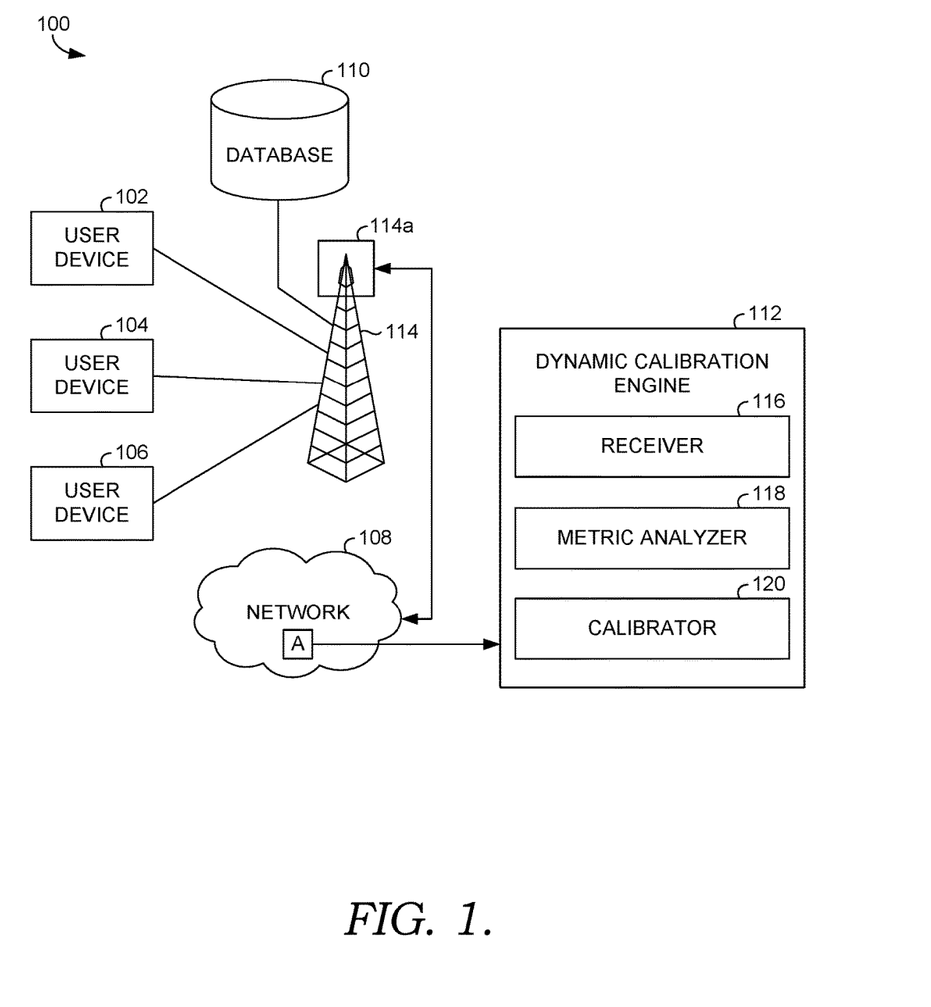
FIG. 1 depicts a diagram of an exemplary dynamic calibration system, in accordance with implementations of the present disclosure.

FIG. 1 provides a diagram 100 which depicts an exemplary telecommunication network in accordance with implementations of the present disclosure. FIG. 1 includes one or more user devices shown as user device 102, user device 104, and user device 106, a database 110, a network 108, a dynamic calibration engine 112, and a cell site 114. In some embodiments, a user device or the user devices shown may take the form of a wireless or mobile device capable of communication by utilizing a wireless telecommunication network(s). In this example, the user device can be any mobile computing device that communicates by way of a wireless network, for example, a 3G, CDMA, 4G, LTE, WiMAX, 5G or any other type of network.

In FIG. 1, cell site 114 may include one or more antennas 114a, base transmitter stations, radios, transmitter/receivers, digital signal processors, control electronics, GPS equipment, power cabinets or power supply, base stations, etc. The cell site 114 may be communicatively coupled to the network 108, providing a possible communication link between the user device(s) 102, 104, and 106 and the network 108. The network 108 may be a telecommunication network(s), or portion thereof. A telecommunication network might include one or more devices and components, such as base stations, servers, switches, relays, databases, nodes etc., which are not shown so as to not confuse other aspects of the present disclosure. Those devices and components can provide connectivity in a variety of implementations to form a network 108. In addition, the network 108 can be utilized in a variety of manners, such as a single network, multiple networks, or as a network of networks, but, ultimately, is shown as simplified as possible to avoid the risk of confusing other aspects of the present disclosure.

As stated above, network 108 can be part of a telecommunication network that connects subscribers to their service provider(s). In embodiments, network 108 could be associated with a specific telecommunication provider that provides services (e.g. LTE, voice, location, etc.) to user devices, such as user device(s) 102, 104, and 106. For example, user device(s) 102, 104, and 106 may be subscribers to a telecommunication service provider, in which the users are registered or subscribed to receive voice and data services over the network 108. Network 108 may comprise any communication network providing voice and/or data service(s), such as, for example, a 1× circuit voice, a 3G network (e.g., CDMA, CDMA 2000, WCDMA, GSM, UMTS, a 4G network (LTE, WiMAX, HSDPA), or a 5G network.

In general, appropriate calibration has a wide variety of benefits including, but not limited to, increased signal strength to end user devices, increased number of users served, and better network efficiency. As mentioned above, calibration, as used herein, refers generally to calibrating or adjusting a phase signal transmitted to the antenna. Signal strength may be measured by Reference Signal Received Quality ("RSRQ"), Reference Signal Received Power ("RSRP"), Receive Strength Signal Indicator (RSSI), or any other measurement reflective of the received signal strength at a user device. Industry practice currently provides that RSRQ is measured in decibel ("dB") and RSRP is measured in decibel relative to a milliwatt ("dBm"). For simplicity, RSRP will be used for the remaining of the disclosure for references to signal strength, but in no way should signal strength measurements be interpreted to be limited to just RSRP.

The monitoring of the average signal strength measurements can be, in some embodiments, monitored by the antenna, radio, element management system (shown in FIG. 2), or another element of the network. Monitoring of the average signal strength measurement of a user device or devices can serve numerous purposes. One purpose could be to set a baseline average signal strength for the area when phase signals are calibrated or not calibrated. This monitoring could occur in real-time or over the course of 30 seconds, 1 minute, 2 minutes, 5 minutes, 10 minutes, 60 minutes, 2 hours, 4 hours, or any amount of time determined by a network or service operator or owner. This data is useful when determined whether to dynamically apply calibrations.

Typically, calibration rates are pre-set using static schedules that are predetermined by a network controller or another agent with authority to set a calibration schedule. Calibration, when performed, results in a period of downtime or outage such that users are not served while calibration is occurring. Thus, it is not ideal to perform calibration often. However, if a system goes too long without calibrating, phase signals may continue to become out of adjustment and further worsen the situation. By dynamically adjusting the rate of calibration, calibration can be performed often enough to avoid worsening of a situation caused by a need for calibration but not so frequently that service is interrupted unnecessarily.

Returning to FIG. 1, the dynamic calibration engine 112 is configured to dynamically adjust a calibration rate. The dynamic calibration engine 112 may be included in network 108, antenna 114A, or any other component of the cell site 114. The dynamic calibration engine 112 may include a receiver 116, a metric analyzer 118, and a calibrator 120.

The receiver 116 is configured to, among other things, receive data related to the telecommunication system. In particular, the receiver 116 receives telecommunication metrics to use in a calibration determination. Telecommunication metrics may include, but are not limited to, performance metrics, temperature, and error vector magnitude (EVM), or any combination thereof. Each metric may be associated with predetermined thresholds to determine when a calibration is needed and will be discussed in detail below.

Performance metrics, as used herein, generally refer to one or more metrics indicating performance of a user device, a telecommunication network component (e.g., an antenna, a radio, etc.), or the like. Performance metrics may be representative of an individual user device, a plurality of user devices, or an entire sector. Exemplary performance metrics include user device metrics, downlink throughput, sector throughput, channel quality indicators (CQI), key performance indicators (KPI), RSRP, and the like.

Figure 2:
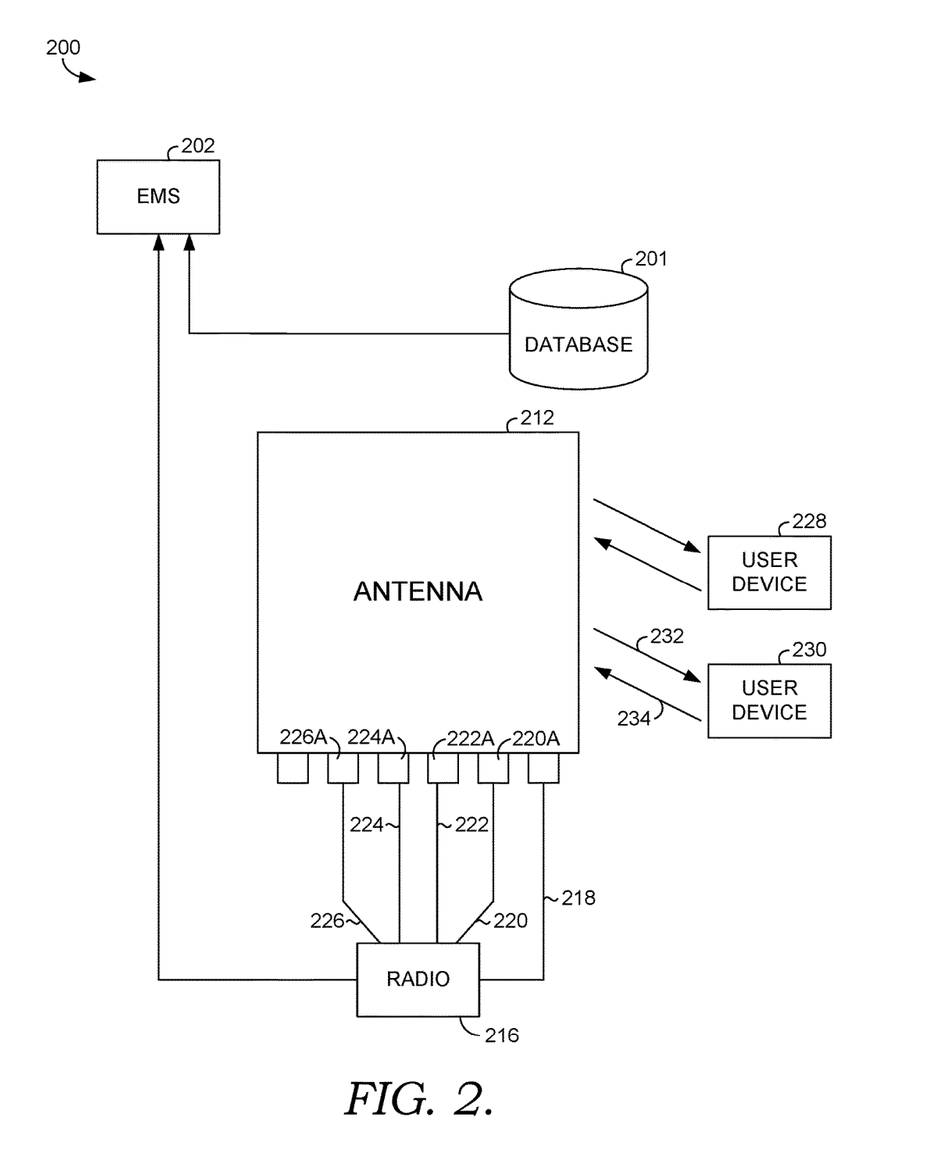
FIG. 2 depicts a diagram of an exemplary dynamic calibration system, in which implementations of the present disclosure may be employed.

For example, referring now to FIG. 2, performance metrics of user device 228 or user device 230 may be received by the receiver 116. FIG. 2 provides a diagram 200 of an exemplary network environment, including an antenna 212, communicatively connected to a radio 216, which in turn is communicatively connected to an element management system (EMS) 202. It should be noted that an element management system (EMS) manages one or more functions or capabilities between one or more network elements throughout a telecommunication network.

Performance metrics of user devices may include signal strength measured by, as explained previously, RSRP. A degradation in RSRP may indicate a phase differential between the port in radio 216 and antenna 212. Additional performance metrics of the user device 230 may include downlink user device throughput 232. The uplink 234 may also be monitored. A degradation in any one of these performance metrics may indicate a phase differential. The phase differential discussed herein occurs in the phase signal communicated by the radio 216 to the antenna 212 via one or more cables (shown as cables 218, 220, 222, 224, and 226) to one or more ports (shown as ports 220A, 222A, 224A, and 226A) of the antenna 212.

In embodiments, performance metrics, such as downlink throughput, may be collected for a plurality of user devices and averaged together to identify a sector throughput for an entire sector. This may provide better insight into sector performance rather than a single instance of a user device. For example, if a sector throughput is expected to be at a sector throughput threshold but is measured below the threshold, it may be an indication that a calibration is necessary. This may be a tiered determination process where the value may be below the threshold and trigger a calibration. Alternatively, the value may need to be below a threshold by a certain amount to trigger a calibration and, if not below the threshold by the certain amount, but below the threshold still, the system may be configured to check the metric more frequently as an alert may be associated with a pending threshold violation.

Performance metrics may be monitored at predetermined time intervals. Performance metrics are useful metrics to use in determining calibration rates since calibration is balanced with maintaining performance without calibrating too frequently. As mentioned above, the performance metrics may also be monitored more frequently if a value is approaching a threshold (either exceeding or falling below, whichever is identified as a violation) or has already surpassed the threshold (either above or below) but is within a caution range where calibration is not yet triggered but may be soon.

The performance metrics may be monitored at the radio (such as radio 216), the antenna (such as antenna 212 or antenna 114A) or the network 108 (e.g., the dynamic calibration engine 112). In embodiments, an eNodeB monitors the performance metrics and transmits a notification to the element management system (EMS) 202 of FIG. 2 for a change in an occurrence rate of calibration. The EMS may be a remote component or located at a base station.

Performance metrics may trigger an evaluation of phase differentials measured in one or more cables 218, 220, 222, 224, and 226 between radio 216 and antenna 212 (specifically, to the ports 220A, 222A, 224A, and 226A of antenna 212). The phase differentials may be obtained by a comparison to a baseline versus a present reading for a cable rather than a comparison to other cables. The observation of a degradation in performance metrics may trigger further investigation into phase differentials, which may identify with greater confidence when calibration is needed.

Telecommunication metrics further include temperature. In particular, temperature differentials within the telecommunication system 100 are important to identify a potential need for calibrations. In a network, temperature differentials may impact the phase of signals through the cables (e.g., cables 218, 220, 222, 224, and 226) connecting the radio 216 and the antenna ports 220A, 222A, 224A, and 226A of antenna 212. This impacts the phases at the input of the antenna connectors and eventually the pattern/coverage related to beamforming service beams. Calibration can correct the phase differentials at the input of the antenna ports.

The temperature, like performance metrics, may be monitored by the EMS 202. The EMS 202 may be connected to a database 201 that includes information relevant to a temperature evaluation. The information relevant to a temperature differential may include time of day logic, forecast logic, or information from temperature sensors. The database may be programmed with a time of day logic. For example, it is likely that items facing the west will experience an increase in temperature at sunset. The database may also include an updated weather forecast that feeds into a temperature evaluation. For example, if the forecast indicates it is a cloudy day, the time of day logic may not be as important. In other words, on a cloudy day, sunset may not be as big of a concern for western facing objects as it would be on a day of direct sunlight. Finally, temperature sensors may be installed on one or more cables to collect temperature data.

Figure 3:
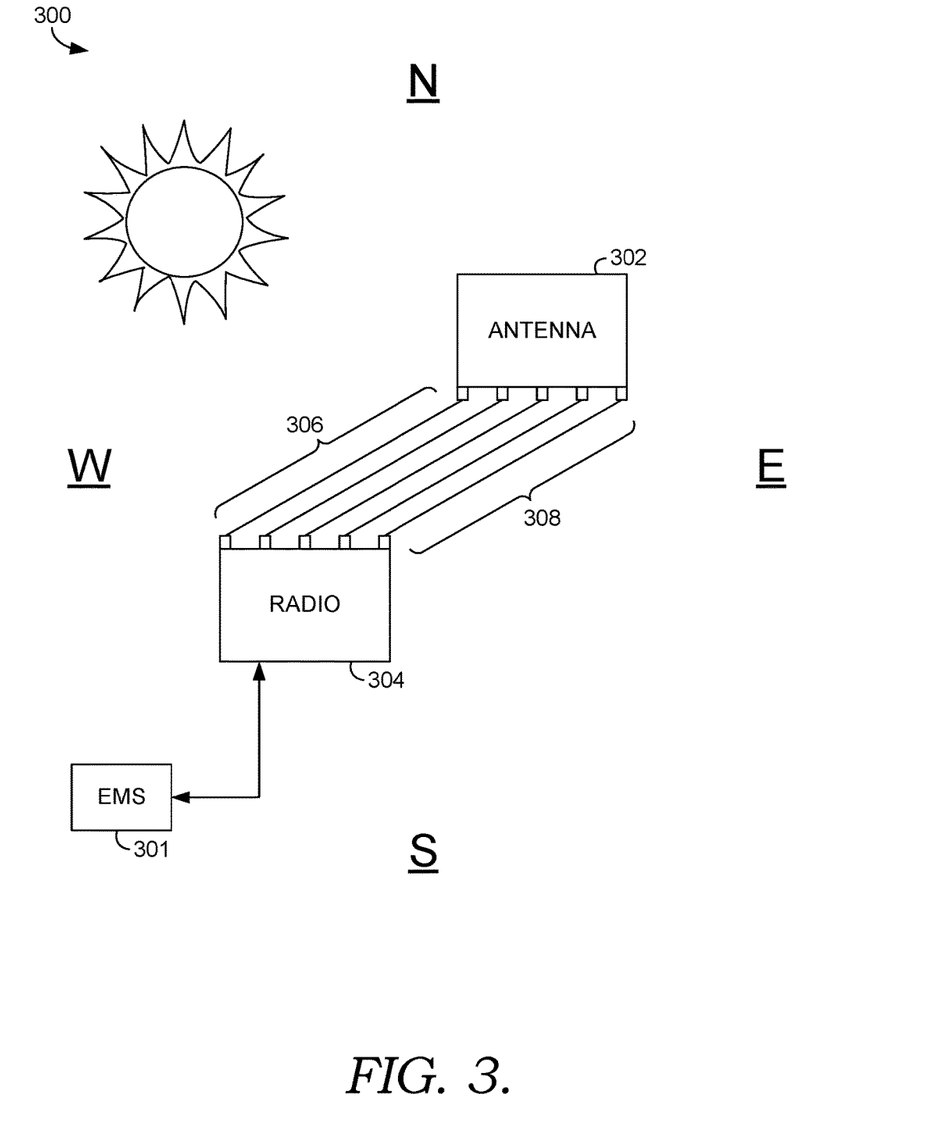
FIG. 3 depicts a diagram of an exemplary radio communicatively coupled to an antenna, in which implementations of the present disclosure may be employed.

Turning now to FIG. 3, an exemplary environment 300 illustrating a temperature differential scenario is provided. The antenna 302 and radio 304 are coupled to one another via one or more cables (shown as 306 and 308). The radio is further coupled to the EMS 301. In the environment 300, the western facing cables, shown as group 306, are likely to experience higher temperatures at sunset than, for instance, at sunrise. A temperature differential between cables indicates a high probability of a phase differential. The temperature differential may be between multiple cables or individual cables. Alternatively, the cables may be compared as groups such as outermost cables. In one embodiment, the outermost cables at a first end, such as cables 306, may be compared to outermost cables at a second end, such as cables 308, rather than each cable coupled to the radio 304 and antenna 302. This comparison, as explained above, may be based on forecast data, time of day logic, temperature sensors, or a combination thereof. The temperature sensors may be placed on any of the cables as deemed relevant by an agent.

Finally, telecommunication metrics further include error vector magnitude (EVM). EVM is a measure of performance of a transmitter (e.g., radio) in the presence of external factors such as noise, distortion, spurious signals, and phase noise, which all degrade EVM. The EVM, therefore, provides a comprehensive measure of the quality of the radio receiver or transmitter. If the EVM is high, the phases arriving at the antenna connectors from the radios would be impacted and there would be a phase differential, impacting beamforming service beam patterns.

Figure 4A:
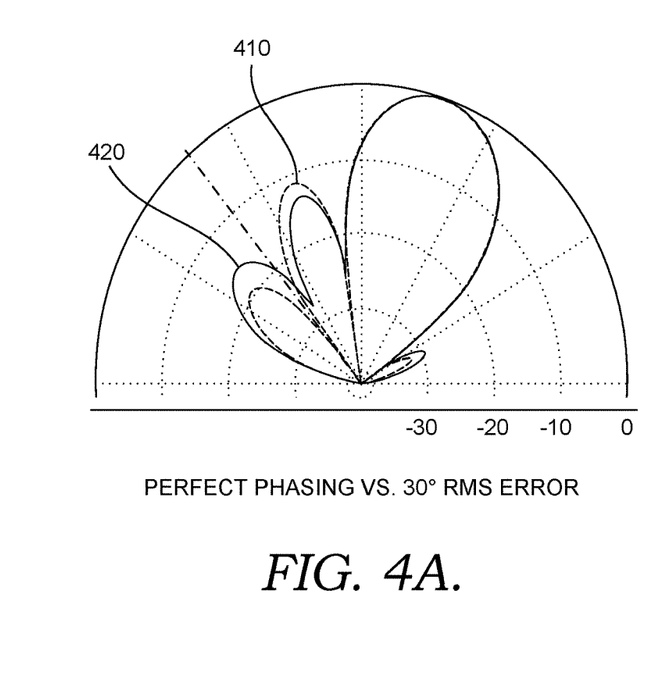
FIG. 4A depicts a beamforming pattern and a distorted beamforming pattern at a first error, in accordance with implementations of the present disclosure.
Figure 4B:
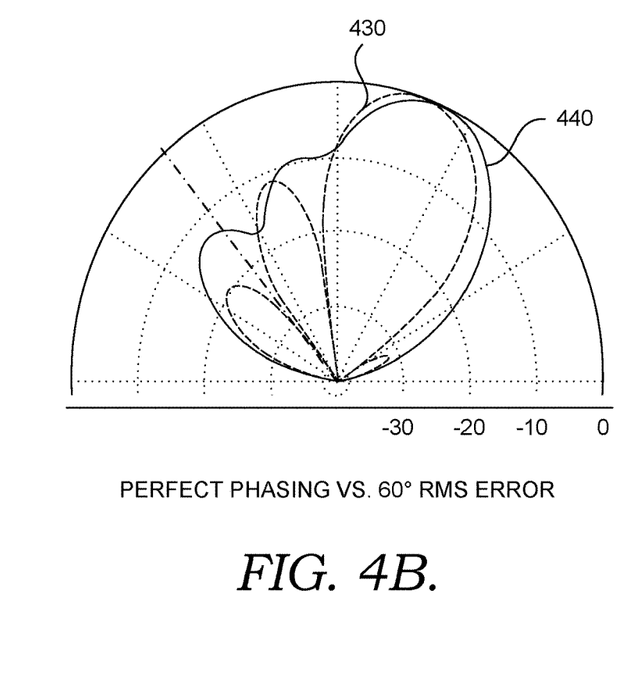
FIG. 4B depicts a beamforming pattern and a second distorted beamforming pattern at a second error, in accordance with implementations of the present disclosure.

FIGS. 4A and 4B provide an exemplary phase and phases with errors. FIG. 4A illustrates a perfect phase 410 versus an error phase 420 having a 30 degree error. Similarly, FIG. 4B illustrates a perfect phase 430 versus an error phase 440 having a 60 degree error. As is shown, it is crucial that beamforming service beam patterns are correct.

The EVM may be monitored by the eNodeB or at the EMS 202, as well. The EMS, in embodiments, is included in the network 108 of FIG. 1, at the antenna 114A, or at any other location deemed appropriate. If the EVM is above a predefined threshold, a notification is communicated to the EMS by, for example, the metric analyzer 118. A recommended adjustment for calibration may be based on the variance of the EVM. For instance, if the variance of EVM is high (e.g., a predetermined amount above a threshold), the rate of calibration may be more frequent (e.g., a predetermined frequency higher than a baseline frequency). If the variance of EVM is low (e.g., above a threshold but lower than the predetermined amount above the threshold for a high EVM), the rate of calibration may be less frequent (e.g., a predetermined frequency higher than a baseline frequency but less than the predetermined frequency for a high EVM). Evaluating the EVM is beneficial as there is no user device performance to measure. It is solely the transmitter perspective and effects the entire sector or adjacent sectors, rather than merely a user device (or a few).

The system 200 may implement a hold on calibration so that another calibration does not begin for a predetermined period of time after a previous calibration ends. Otherwise, an infinite calibration cycle may be the result.

Returning now to FIG. 1, the metric analyzer 118 is configured to analyze the received metrics, some of which were discussed above. For instance, the metric analyzer 118 determines when a temperature differential justifies a calibration adjustment, according to baselines. Additionally, the metric analyzer 118 evaluates EVM variance and determines if a calibration adjustment is necessary and, if so, how frequently to calibrate.

The metric analyzer 118 may also trigger inspection into the phase differentials. In order to adjust or calibrate the phase signals, a phase differential should be identified. The phase differentials may be identified at the cables connecting a radio and an antenna. The differentials will provide the data necessary to calculate an offset to apply to one or more of the phase signals in order to correct the differential.

The metric analyzer 118 may also be configured to prepare a recommendation for an adjustment to the calibration rate. The recommendation may include instructions to calibrate. The recommendation may also include a frequency with which to calibrate, an end time to terminate the calibration adjustment instructions, and the like. The recommendation may also include instructions on how to calibrate. For instance, the phase differentials measured may require a certain offset and that offset may be included in the instructions (e.g., the phase signal output at the radio is different than the phase signal received at a port of the antenna and requires a certain offset in order to make the output/input equal).

The metric analyzer 118 communicates the instructions to the calibrator 120. The calibrator 120 is configured to execute the instructions and implement the adjustment to the calibration rate. In particular, the calibrator 120 is configured to make any necessary changes to phase signals, offsets, etc., in order to implement the instructions. Thus, if an offset of X is required, the calibrator 120 initiates the offset in order to perform the calibration as instructed.

Figure 5:
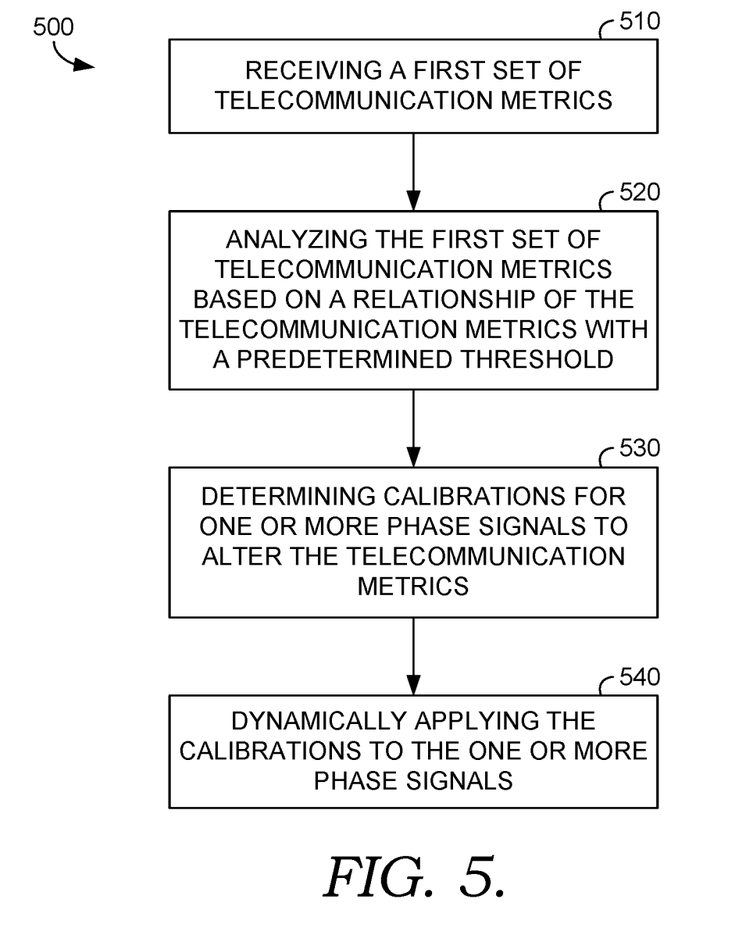
FIG. 5 depicts a flow diagram of an exemplary method for dynamic adjustment of a calibration rate, in accordance with implementations of the present disclosure.

FIG. 5 depicts a flow diagram of an exemplary method 500 for dynamically adjusting a calibration rate. Initially at block 510, a first set of telecommunication metrics is received. As previously discussed, the telecommunication metrics may include performance metrics (of a user device or an entire sector), temperature metrics, or EVM. At block 520, the first set of telecommunication metrics are analyzed based on a relationship of the telecommunication metrics with a predetermined threshold. At block 530, calibrations are determined for one or more phase signals to adjust the telecommunication metrics. At block 540, the calibrations are dynamically applied to the one or more phase signals.

Figure 6:
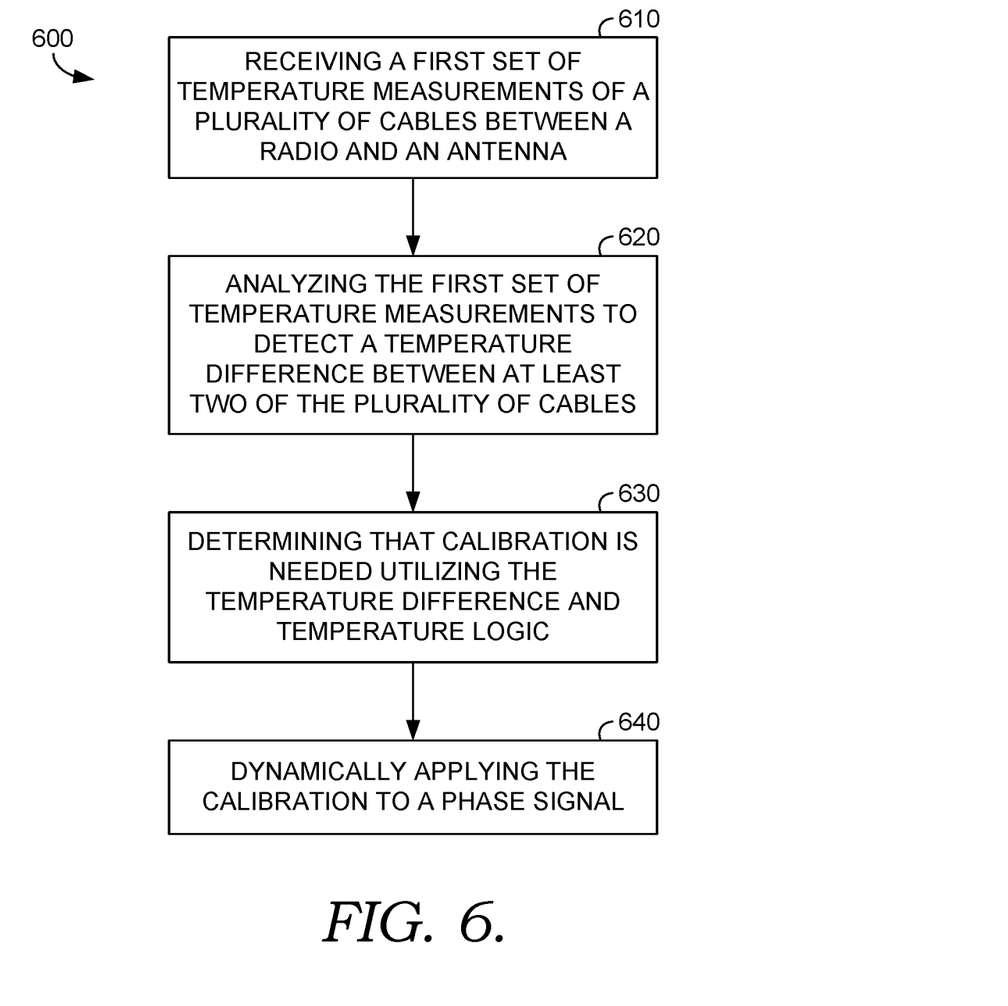
FIG. 6 depicts a flow diagram of an exemplary method for dynamic adjustment of a calibration rate, in accordance with implementations of the present disclosure.

FIG. 6 depicts a flow diagram of an exemplary method 600 for dynamically adjusting a calibration rate. Initially at block 610, a first set of temperature measurements of a plurality of cables between a radio and an antenna are received. At block 620, the first set of temperature measurements are analyzed to detect a temperature differential between at least two of the plurality of cables. At block 630, it is determined that calibration is needed utilizing the detected temperature differential and temperature logic. At block 640, the calibration is dynamically applied to a phase signal. The calibration is dynamically applied at a time different than originally scheduled.

Embodiments of the technology, stated above, may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Figure 7:
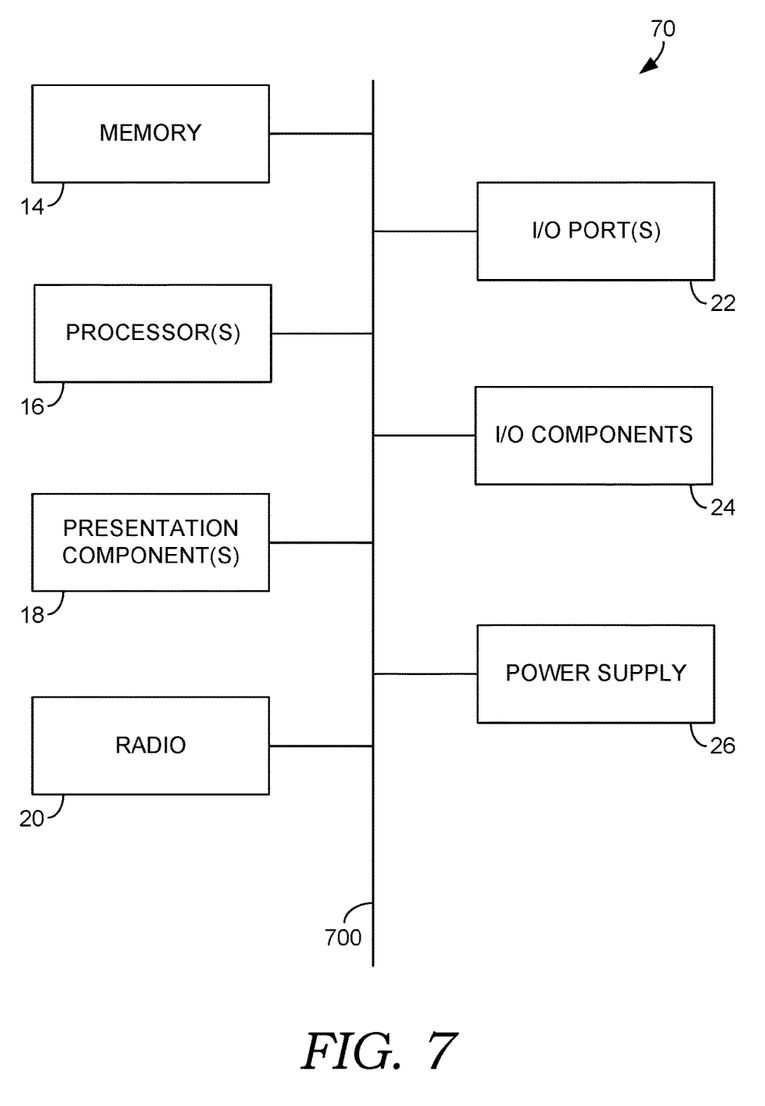
FIG. 7 depicts a diagram of an exemplary computing environment suitable for use in implementations of the present disclosure.

Referring to FIG. 7, a diagram is depicted of an exemplary computing environment suitable for use in implementations of the present disclosure. In particular, the exemplary computer environment is shown and designated generally as computing device 70. Computing device 70 is but one example of a suitable computing environment and is not intended to suggest any limitation as to the scope of use or functionality of the invention. Neither should computing device 70 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 70 includes bus 700 that directly or indirectly couples the following devices: memory 14, one or more processors 16, one or more presentation components 18, radio 20, input/output (I/O) ports 22, I/O components 24, and power supply 26. Bus 700 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component such as a display device to be one of I/O components 24. Also, processors, such as one or more processors 16, have memory. The present disclosure hereof recognizes that such is the nature of the art, and reiterates that FIG. 7 is merely illustrative of an exemplary computing environment that can be used in connection with one or more implementations of the present disclosure.

Distinction is not made between such categories as "workstation," "server," "laptop," "handheld device," etc., as all are contemplated within the scope of FIG. 7 and refer to "computer" or "computing device."

Computing device 70 typically includes a variety of computer-readable media. Computer-readable media can be any available media that can be accessed by computing device 70 and includes both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules or other data. Computer storage media may include media implemented in any method or technology for storing information. Computer storage media includes RAM, ROM, EEPROM, flash memory or other memory technology, CD-ROM, digital versatile disks (DVD), holographic media or other optical disk storage, magnetic cassettes, magnetic tape, magnetic disk storage or other magnetic storage devices. These memory components can store data momentarily, temporarily, or permanently. Computer storage media does not comprise a propagated data signal.

Communication media typically embodies computer-readable instructions, data structures, program modules or other data in a modulated data signal. The term "modulated data signal" refers to a propagated signal that has one or more of its characteristics set or changed to encode information in the signal. Communication media include any information-delivery media. By way of example, and not limitation, communication media includes wired media such as a wired network or direct-wired connection, and wireless media such as acoustic, RF, infrared, radio, microwave, spread-spectrum, and other wireless media technologies. Combinations of any of the above should also be included within the scope of computer-readable media.

Memory 14 includes computer-storage media in the form of volatile and/or nonvolatile memory. Memory 14 may be removable, nonremovable, or a combination thereof. Exemplary memory includes solid-state memory, hard drives, optical-disc drives, etc. Computing device 70 includes one or more processors 16 that read data from various entities such as bus 700, memory 14 or I/O components 24. One or more presentation components 18 presents data indications to a person or other device. Exemplary one or more presentation components 18 include a display device, speaker, printing component, vibrating component, etc. I/O ports 22 allow computing device 70 to be logically coupled to other devices including I/O components 24, some of which may be built in computing device 70. Illustrative I/O components 24 include a microphone, joystick, game pad, satellite dish, scanner, printer, wireless device, etc.

Radio 20 represents a radio that facilitates communication with a wireless telecommunication network. Illustrative wireless telecommunication technologies include CDMA, GPRS, TDMA, GSM, and the like. Radio 20 might additionally or alternatively facilitate other types of wireless communications including Wi-Fi, WiMAX, LTE, or other VoIP communications. As can be appreciated, in various embodiments, radio 20 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically adjusting a calibration rate, the method comprising:
   receiving a first set of telecommunication metrics from one or more user devices, wherein the first set of telecommunication metrics comprises performance metrics of at least one of the one or more user devices;
   analyzing the first set of telecommunication metrics based on a relationship of the telecommunication metrics with a predetermined threshold;
   determining calibrations for one or more phase signals to alter the telecommunication metrics; and
   dynamically applying the calibrations to the one or more phase signals.

2. The method of claim 1, further comprising triggering a mechanism to evaluate for calibrations when the performance metrics are below a predetermined performance metric threshold.

3. The method of claim 1, further comprising receiving a second set of telecommunication metrics, wherein the second set of telecommunication metrics comprise a temperature of one or more cables between a radio and an antenna.

4. The method of claim 3, further comprising triggering a mechanism to evaluate for calibrations when the temperature of one or more cables between the radio and the antenna is above a predetermined temperature threshold.

5. The method of claim 1, further comprising receiving a second set of telecommunication metrics, wherein the second set of telecommunication metrics comprise error vector magnitude, wherein the error vector magnitude is a measure of a performance of a radio in the presence of external impairments.

6. The method of claim 1, wherein one or more components to which to apply the calibrations includes one or more components of an antenna.

7. The method of claim 1, wherein determining calibrations for the one or more phase signals includes determining when to apply the calibrations to the one or more phase signals.

8. A method for dynamically adjusting a calibration rate, the method comprising:
   receiving a first set of temperature measurements of a plurality of cables between a radio and an antenna;
   analyzing the first set of temperature measurements to detect a temperature difference between at least two of the plurality of cables;

determining that calibration is needed utilizing the temperature difference and temperature logic; and dynamically applying the calibration to a phase signal communicated from a radio to an antenna.

9. The method of claim 8, wherein the temperature logic includes forecast logic obtained from a weather database.

10. The method of claim 8, wherein the temperature logic includes time of day logic.

11. The method of claim 8, wherein the at least two cables are a first outermost cable on a first end and a second outermost cable on a second end.

12. The method of claim 11, wherein the temperature difference is measured between each cable of the plurality of cables.

13. The method of claim 8, wherein the temperature difference is obtained utilizing one or more temperature sensors at the plurality of cables.

14. A dynamic calibration system for dynamically adjusting a calibration rate, the dynamic calibration system comprising:

a processor; and one or more computer storage hardware devices storing computer-usable instructions that, when used by the processor, cause the processor to:

receive a first set of temperature measurements from one or more temperature sensors of a plurality of cables between a radio and an antenna;

analyze the first set of temperature measurements to detect a temperature difference between at least two of the plurality of cables;

determine that calibration is needed utilizing the temperature difference and temperature logic; and dynamically apply the calibration to a phase signal.

15. The dynamic calibration system of claim 14, wherein the temperature logic includes forecast logic obtained from a weather database.

16. The dynamic calibration system of claim 14, wherein the temperature logic includes time of day logic.

17. The dynamic calibration system of claim 14, wherein the temperature difference is measured between each cable of the plurality of cables.

18. The dynamic calibration system of claim 14, wherein the at least two cables are a first outermost cable on a first end and a second outermost cable on a second end.

* * * * *